United States Patent
Derrieu et al.

(10) Patent No.: US 6,382,137 B1
(45) Date of Patent: May 7, 2002

(54) DEVICE FOR CONTROLLED RELEASE OF ACTIVE SUBSTANCES AND FOR RESTRAINT AND METHOD FOR MAKING SAME

(75) Inventors: Guy Derrieu, Cagnes sur Mer; Bruno Roy, Vence; Christian Karst, Villeneuve Loubert; Thierry Grenier, Mimet, all of (FR)

(73) Assignee: Virbac, Carros (FR)

( * ) Notice: Subject to any disclaimer, the term of this patent is extended or adjusted under 35 U.S.C. 154(b) by 0 days.

(21) Appl. No.: 09/582,527

(22) PCT Filed: Dec. 17, 1998

(86) PCT No.: PCT/FR98/02759

§ 371 Date: Sep. 5, 2000

§ 102(e) Date: Sep. 5, 2000

(87) PCT Pub. No.: WO99/34666

PCT Pub. Date: Jul. 15, 1999

(30) Foreign Application Priority Data

Dec. 31, 1997 (FR) ............................. 97 16774

(51) Int. Cl.⁷ ................................................ A01K 29/00
(52) U.S. Cl. ................. 119/654; 119/712; 119/653
(58) Field of Search .................. 119/712, 769, 119/774, 792, 795, 650, 652, 653, 654

(56) References Cited

U.S. PATENT DOCUMENTS

| | | | | |
|---|---|---|---|---|
| 3,978,820 A | * | 9/1976 | Drehman | 119/712 |
| 4,141,322 A | * | 2/1979 | Evans et al. | 119/72 |
| 4,150,109 A | * | 4/1979 | Dick et al. | 424/28 |
| 4,184,452 A | * | 1/1980 | Buzzell et al. | 119/712 |
| 4,224,901 A | * | 9/1980 | Carey, Jr. | 119/712 |
| 4,803,956 A | * | 2/1989 | Corrigan et al. | 119/712 |
| 4,879,117 A | | 11/1989 | Rombi | 424/411 |
| 4,930,451 A | * | 6/1990 | Miller et al. | 119/712 |
| 5,555,848 A | * | 9/1996 | Trujillo et al. | 119/654 |

FOREIGN PATENT DOCUMENTS

| | | |
|---|---|---|
| EP | 0 722 656 A1 | 7/1996 |
| FR | 2 645 402 | 10/1990 |
| FR | 2 656 526 | 7/1991 |
| FR | 2 703 214 | 10/1994 |
| FR | 2 728 431 | 6/1996 |

* cited by examiner

Primary Examiner—Charles T. Jordan
Assistant Examiner—Judith A. Nelson
(74) Attorney, Agent, or Firm—Morgan, Lewis & Bockius LLP

(57) ABSTRACT

Device designed to be carried by an animal and capable of controlled release of one or several active principles and, more particularly, one or several medicinal active principles to protect and/or treat this animal against possible pathologies, and capable of being used as a restraint for controlling and managing the animal. In one embodiment the device is used with a leash or lead fixed to the device. Method for making the device. The device comprises a first material for the controlled release of one or several active substances of polymer matrix type containing this active substance and a second material for providing it with mechanical resistance, the materials being closely bound within a single structure.

13 Claims, 2 Drawing Sheets

DEVICE FOR CONTROLLED RELEASE OF ACTIVE SUBSTANCES AND FOR RESTRAINT AND METHOD FOR MAKING SAME

The present invention relates to a device intended to be worn by an animal, which is capable firstly of controlled release of one or more active substances and more particularly one or more medicinal active principles capable of protecting and/or treating this animal against possible pathologies, and secondly of serving as a means of restraint for controlling and mastering said animal, preferably in combination with a leash or lead fixed to said device.

The present invention also relates to a method for manufacturing this device.

A large number of devices for the controlled and programmed release of active substances are already known.

Among the devices which are known in particular are devices which are essentially intended for the production of collars and which are capable of slow and gradual release, on contact with an animal's coat, of an antiparasitic agent to provide the animal with protection against ectoparasites such as fleas and ticks for several months.

Such devices are described, for example, in French patents Nos. 2 269 859, 2 307 466 and 2 447 679 in the name of P. R. Dick et al. and in French patents Nos. 2 656 526 and 2 529 539 in the name of the Applicant, the common feature of which is that they consist of a matrix formed from a thermoplastic resin and containing the antiparasitic agent to be released along with adjuvants such as plasticizers, stabilizers, fillers or pigments.

These devices are unsuitable for use as means of restraint on account of the plastic nature of the matrix of which they are formed, such that, in the case of an antiparasitic collar, for example, it is necessary to use this collar together with a second collar which is suitable for attaching a leash or any other means of maintenance and, optionally, for identifying the animal. Moreover, they are unattractive and, what is more, since they are intended to be discarded after a few months, little effort has been made by manufacturers to make them look more attractive.

A large number of restraining systems intended for pets are moreover known, such as collars, halters, harnesses, girths or the like, which comprise one or more straps made of leather, metal, natural or synthetic fibers or combinations of such materials and which are equipped with a closure device and a ring allowing the removable attachment of a leash or lead, depending on the case. Needless to say, these systems lack any protective and/or curative function.

Also, French patent applications Nos. 2 645 402, 2 703 214 and 2 728 431 disclose animal collars which are designed to fulfill both a restraining role and a protective role, in particular against ectoparasites, by placing a member capable of acting as restraining means next to a member capable of diffusing an antiparasitic agent.

Thus, French patent application No. 2 645 402 proposes to produce a collar in the form of a sheath whose wall intended to be placed in contact with the animal's coat is pierced with orifices, and to slide into this sheath a strip impregnated with a volatile antiparasitic product, such that this product diffuses through said orifices. This collar is furthermore designed to allow, when the strip housed in the sheath becomes inactive due to complete evaporation of the antiparasitic product, the removal of this strip and its replacement with a new strip.

French patent application No. 2 703 214 for its part proposes to produce a collar by combining, with a conventional collar, i.e. a simple leather strap, a strip of an antiparasitic material intended to be changed at will, this combination possibly being produced either by the removable attachment of the strip with antiparasitic action onto the strap, or by the introduction of said strip into a porous sheath connected to said strap.

As regards French patent application No. 2 728 431, it discloses a collar whose outer part—i.e. the part opposite that intended to be in contact with the animal's coat—is formed from a strip of plastic in which is crafted a housing for inserting a layer of a material containing an active product, which is intended to form the inner part of the collar and which is held in this housing by forced interlocking, bonding or by means of flanges that are solidly attached to said plastic strip.

Although it is true that the collars disclosed in these three documents have the advantage of not making it necessary for two collars to be worn simultaneously by an animal which it is desired both to protect against ectoparasites and to maintain or control by means, for example, of a leash or lead, their use in practice is not really satisfactory. Specifically, since these collars consist of the juxtaposition of two members of different nature and since they tend to become dissociated under the effect of the mechanical stresses to which the collars are subjected under the conditions of use, there is an appreciable risk of the member containing the active substance becoming partially or totally separated from the rest of the collar with, as a key factor, a risk of the animal becoming injured, of it no longer being protected and of it swallowing all or part of this member and, as a result, being poisoned. Furthermore, these collars are generally unattractive since the juxtaposition of the two members of which they consist gives them either a bulky appearance or the appearance of an unfinished product.

The Applicant consequently set itself the aim of providing a device capable of releasing, on contact with an animal's coat, one or more active substances in a controlled and prolonged manner, which device is strong enough to be able to serve simultaneously as restraining means while at the same time having a flexibility allowing it to adapt to the anatomical shapes of the animal for which this device is intended, which is well tolerated by the animal wearing it, which furthermore is free of any hazard for the animal and other creatures in its vicinity and which moreover has a satisfactory aesthetic appearance such that it can also serve as decoration.

The Applicant moreover set itself the aim of providing a device which, while at the same time having the advantages mentioned above, has a manufacturing cost which is compatible with the industrial requirements.

These aims are achieved according to the present invention by a device intended to be worn by an animal, which is capable of controlled release of one or more active substances and of serving simultaneously as restraining means to control and master said animal, which comprises a first material consisting of a polymer matrix including said active substance(s), and a second material for giving said device mechanical strength, and which is characterized in that the two materials are intimately combined in a single structure.

According to a first embodiment of the device in accordance with the invention, the single structure formed by the two materials is a crosslinked structure.

According to one advantageous arrangement of this first embodiment, the crosslinked structure is a structure obtained by weaving or knitting at least one yarn of polymer matrix with yarns of an organic or inorganic material.

For the purposes of the present invention, the term "yarn" denotes an elongate supple body of constant or substantially constant right cross section which is small relative to its length, and which can consist either of a single member of a material, or of an assembly of several members of one and the same material held in close lateral contact.

Thus, as examples of yarns of organic or inorganic material which can be used in the present invention, mention may be made of:

textile fibers and yarns based on natural organic polymers such as cotton, flax, hemp, sisal and wool yarns;

textile fibers and yarns based on synthetic organic polymers such as polyolefin (polyethylene, polypropylene, etc.), polyester, polyamide, poly(vinyl alcohol) or polyurethane yarns, acrylic yarns and aramide yarns;

leather yarns and straps;

fibers and yarns of inorganic materials such as carbon, glass and metal.

According to another advantageous arrangement of this first embodiment, the crosslinked structure is a structure obtained by weaving or knitting yarns of an organic or inorganic material coated with one or more layers of polymer matrix, optionally in combination with yarns that are not coated with the polymer matrix.

In order to increase the mechanical strength of the device, the crosslinked structure is advantageously obtained by means of circular weaving or knitting. Specifically, such weaving or knitting makes it possible to obtain a tubular structure which, after flattening, produces a strip formed of two thicknesses of fabric or knitted material.

According to yet another advantageous arrangement of this first embodiment, the crosslinked structure is a structure obtained by braiding or twisting at least one yarn of polymer matrix with yarns of an organic or inorganic material.

According to yet another advantageous arrangement of this first embodiment, the crosslinked structure is a structure obtained by braiding or twisting yarns of an organic or inorganic material coated with one or more layers of polymer matrix, optionally in combination with yarns that are not coated with the polymer matrix.

According to another embodiment of the device in accordance with the invention, the structure formed by the two materials is a structure in which the material for giving said device mechanical strength is incorporated in the thickness or on at least one of the surfaces of a strip of polymer matrix.

According to one preferred arrangement of this embodiment, the material for giving the device mechanical strength is a ribbon obtained by weaving, knitting, braiding, twisting or by any entanglement of yarns of an organic or inorganic material, this ribbon preferably being arranged in the longitudinal direction of the strip of polymer matrix.

However, it is also possible to envisage the material for giving the device mechanical strength consisting of a continuous yarn of an organic or inorganic material, of circular or, preferably, rectangular right cross section, such as a leather strap, or of a bundle of continuous yarns that are parallel or substantially parallel to each other and advantageously not joined together, this or these yarn(s) preferably being arranged in the longitudinal direction of the strip of polymer matrix.

In accordance with the invention, the material capable of releasing the active substance(s) is a polymer matrix which comprises said active substance(s).

This matrix can be made of any polymer or copolymer whose implementation, by extrusion, molding, calendering or any other means, produces a flexible plastic structure. Polymers which are particularly suitable for carrying out the invention are vinyl polymers and in particular polyvinyl chloride, polyolefins (polyethylenes, polypropylenes, etc.), polyacetates, polyurethanes and vinyl acetates.

It can furthermore comprise one or more adjuvants such as a plasticizer, a lubricant, a stabilizer, fillers, a dye or a pigment, an antioxidant, a pore-forming agent, a deodorant or a fragrance.

The plasticizer is advantageously chosen from liquid esters whose vapor pressure is less than 0.0001 mmHg at 25° C., such as diethyl, 2-diethylhexyl, dimethyl, dipropyl, dibutyl, dihexyl or dioctyl phthalate; isobutyl, dibutyl, diisobutyl, 2-diethylhexyl, diamyl or dinonyl adipate; dipropyl, dibutyl, dibenzyl or dioctyl sebacate; diethyl, dipropyl, dibutyl or acetyltributyl citrate; triphenyl or tricresyl phosphate, or triglycerides.

The lubricant is for its part chosen as a function of the polymer or copolymer intended to form the matrix and of the process by which it is desired to use this polymer or copolymer. Thus, for example, when it is desired to use polyvinyl chloride and to subject it to an extrusion, stearic acid or a calcium, magnesium or potassium stearate, laurate or palmitate is preferably used.

The stabilizer is also chosen as a function of the polymer or copolymer intended to form the polymer matrix. As examples of stabilizers which may be used together with polyvinyl chloride, mention may be made of epoxides (epichlorohydrin, epoxidized soybean oil, etc.) and metal soaps such as calcium or zinc soaps.

As regards the fillers, they are preferably inorganic fillers such as barium sulfates, calcium carbonates, zeolites, diatomaceous earths, kaolins, talcs, silicas, hydrated silicates or antimony trioxide.

The device in accordance with the invention can be used either to administer to an animal one or more medicinal active principles of systemic (transdermal route) or local use, or to release into its coat products with repellent power (essences of citronella, of eucalyptus or of mint and, in particular, of pennyroyal, N,N-diethyl-m-toluamidine, etc.) or with deodorant power (natural or synthetic deodorants) or alternatively fragrances.

This or these medicinal active principles can be chosen in particular from the group comprising:

insecticides and acaricides such as organophosphorous agents, pyrethrums, pyrethroids, carbamates, nitroguanidines, formamidines, phenylpyrazoles or phenoxypyrazoles;

ovicides and larvicides such as fenoxycarb, methoprene or pyriproxyfen;

antibiotics of macrolide type such as avermectins (abamectin), dihydroavermectins (iver-mectin), milbemycins (milbemycin D, moxidectin, etc.) or doramectin;

vitamins such as vitamin A and its derivatives, vitamin E and its derivatives, vitamin F and its esters or essential fatty acids;

steroidal or nonsteroidal anti-inflammatory agents; and fungicides.

Irrespective of the embodiment of the device in accordance with the invention, it comprises closure means such as a buckle with a tongue, a lever clasp, a click-locking system or the like, to keep it on the animal and means for removably attaching a leash or lead, such as ring.

This device is preferably a collar, a harness or a halter.

Even more preferably, this collar, harness or halter is intended to protect and/or treat the animal against endoparasites and/or ectoparasites.

A subject of the present invention is also a method for manufacturing a device as defined above, which method is characterized in that it comprises a step consisting in combining the polymer matrix containing the active substance(s) and the material for giving said device mechanical strength, such that they form a single structure.

According to one preferred embodiment of this method, said step comprises an operation of weaving, knitting, braiding or twisting, which operation can be carried out by any technique conventionally used in the textile industry.

According to another preferred mode of implementation of the invention, said step comprises the incorporation of the material for giving the device mechanical strength in the thickness of a strip of polymer matrix or onto at-least one of the surfaces of this strip, for example by pultrusion, extrusion or else calendering.

Besides the preceding arrangements, the invention also comprises other arrangements which will emerge from the description which follows, given by way of examples and with reference to the attached drawings, in which.

and in which the members which are equivalent have been given the same reference numerals.

It should be clearly understood, however, that these examples are given purely as illustrations of the subject matter of the invention and do not in any way constitute a limitation of this subject.

Figure 1:
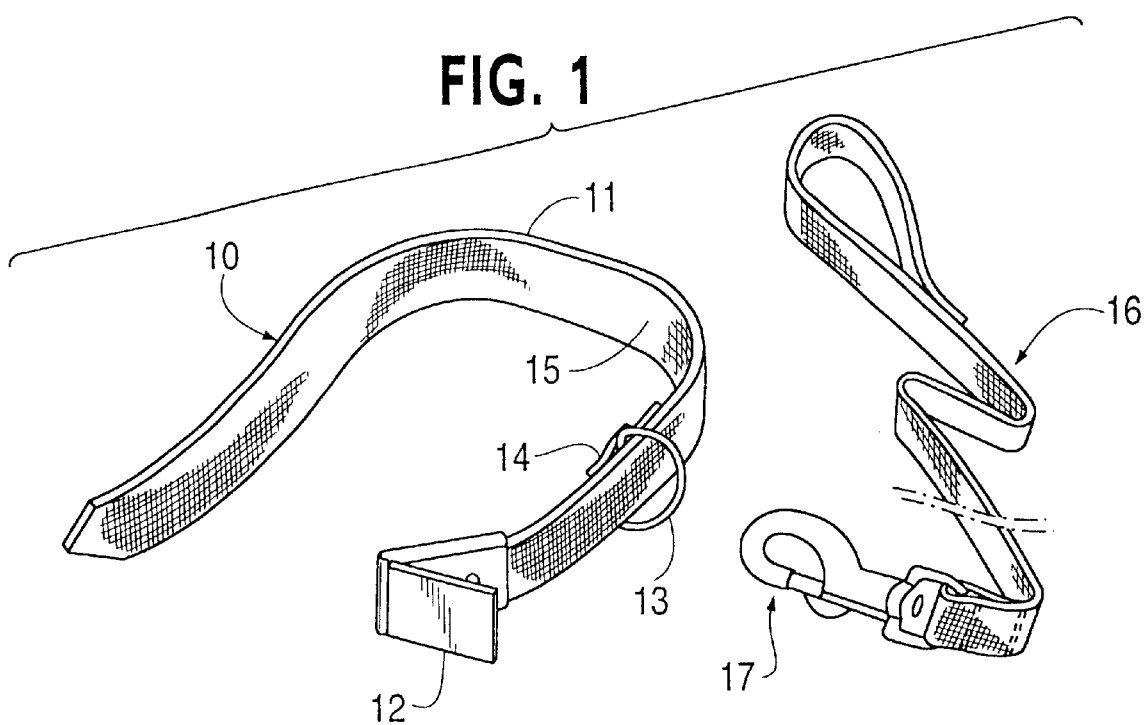
FIG. 1 is a schematic perspective view of a first embodiment of a device in accordance with the invention and of a leash which can be removably attached to this device.

Reference is made first to FIG. 1 which shows, in a first embodiment, a device in accordance with the invention, in the form of a collar 10 intended to be placed around the neck of an animal such as a cat or dog, as well as a leash 16 which can be removably attached to this collar by means of its snap hook 17.

The collar 10 comprises a strap 11 which has, in accordance with the invention, a structure formed by the combination of a polymer matrix capable of ensuring the controlled release of one or more active substances and a material which can give said strap a mechanical strength which is sufficient for the collar to be able to serve as a restraining means and which is, in this case, a woven structure of the type described below with reference to FIGS. 3 to 6.

One end of the strap 11 is equipped with a lever clasp 12 made of metal or of a rigid plastic, which is intended to adjust the length of this collar to the neck size of the animal when it is put on, as well as to block it in closed position, and which is solidly attached to said strap by sewing, riveting or any other means, while its other end finishes in a point to make it easier to insert into the clasp 12 during closure of said collar.

A few centimeters from the clasp 12, the strap 11 comprises a ring 13, also made of metal or of a rigid plastic, which is held by a component 14, advantageously of the same structure as this strap and connected by sewing or any other means onto its inner face 15—i.e. the face of the strap 11 which is intended to be applied to the animal's coat—and which is designed to cooperate with the snap hook 17 of the leash 16 to removably attach this leash to the collar 10.

Figure 2:
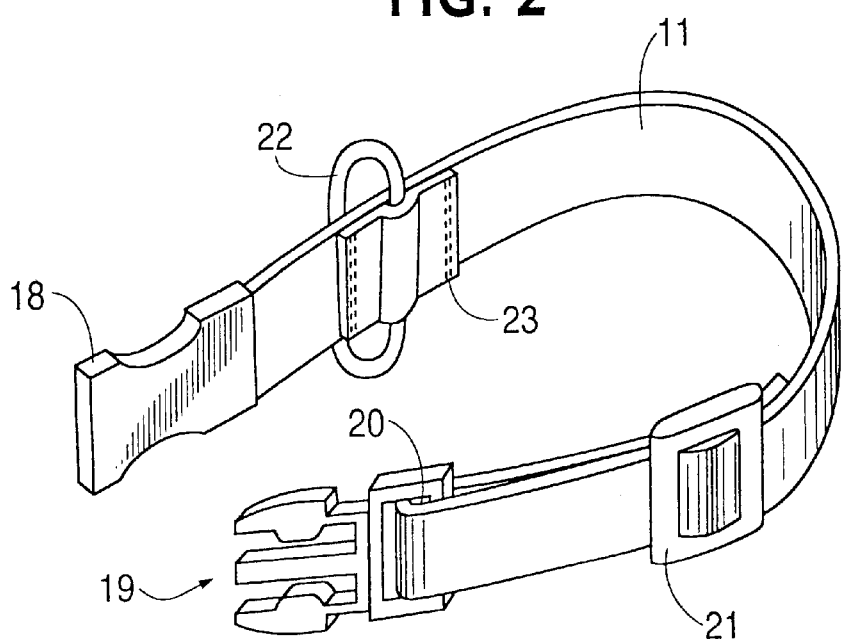
FIG. 2 is a schematic perspective view of another embodiment of a device in accordance with the invention.

FIG. 2 illustrates another embodiment of a device in accordance with the invention which represents one preferred embodiment of this device, in which this device, which is also a collar designed to be placed around an animal's neck, comprises a strap 11 equipped with a click-lock closure system.

In accordance with the invention, this strap has a structure formed by combining a polymer matrix capable of ensuring the controlled release of one or more active substances and a material which can give said strap mechanical strength and which is, in the present case, a structure of the type described below with reference to FIG. 8.

The click-lock closure system with which said strap is equipped is preferably made of a rigid plastic such as polyamide, and is composed of a female part 18 which is fixed to one of the ends of the strap 11, for example by heat-molding on this end, and of a male part 19, premanufactured by molding and capable of being removably secured to the female part by click-locking therein. As can be seen in FIG. 2, the male part 19 of the closure system is equipped with a slot 20 for passing the strap 11 through, at the level of which the strap forms a loop, and is combined with an adjusting and blocking device 21—which is preferably made of the same plastic as the closure system and is attached to the strap 11 by sewing, heat-welding or the like—in which is found the other end of the strap 11 and whose function is to allow, by moving it along this strap, the length of said buckle to be adjusted and blocked and, as a result, to adjust the length of the collar to the animal's neck size.

Such a collar has the advantage of being able to be adapted to any neck size of the animal type for which it is intended (cats, dogs, etc.) and to eliminate the drawbacks associated with the presence of an excessively long free end of strap (need to shorten the collar or to provide a moveable loop, etc.).

The strap 11 moreover has, a few centimeters from the female part 18 of the closure system, a ring 22 for removably attaching a leash as represented in FIG. 1. This ring, which can also be made of the same plastic as the closure system, is solidly attached to the strap 11 via a component 23, of the same structure as the strap, and which is connected by sewing to the inner face of said strap.

Reference is now made to FIGS. 3 to 9 which illustrate various examples of structures which can form part of the constitution of a device in accordance with the invention.

Figure 3:
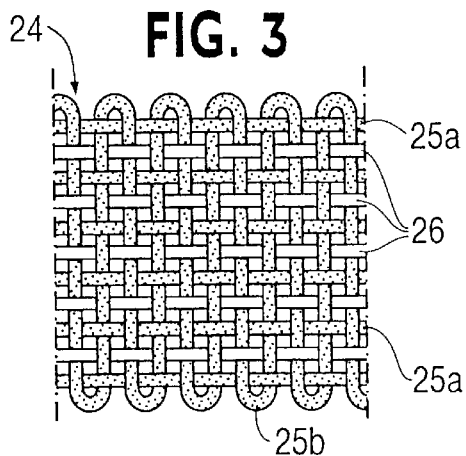
FIG. 3 is a schematic plan view, on a large scale, of a portion of a first example of a structure which can form part of the constitution of a device in accordance with the invention.

As can be seen in FIG. 3, this structure can be a woven structure 24 which is in the form of a strip obtained by a conventional mechanical weaving and composed of a warp comprising an assembly of yarns 25a made of an organic or inorganic material, which are arranged in the longitudinal direction of this strip and which represents the material intended to give the structure mechanical strength. Between these yarns are distributed, either uniformly as shown in FIG. 3, or non-uniformly, yarns 26 consisting of a polymer matrix containing the active substance(s) intended to be released. The weft of this structure comprises an assembly of yarns 25b which are arranged in the transverse direction of the strip and which are advantageously of the same nature as the yarns 25a of the warp.

The number of yarns 25a composing the warp of the woven strip 24 is chosen, for a given number of yarns 26 of polymer matrix intended to be present in this strip, as a function of their diameter—which is preferably between 0.1 and 5 mm—and of the width which it is desired to give to said strip. This warp can thus comprise from 5 to several tens of yarns 25a.

The number of yarns 26 of polymer matrix is chosen as a function of the nature of the substance(s) which need to be released, the daily dose in which it is desired for this or these substances to be released, the desired duration of protection or of treatment as well as, of course, the composition of the polymer matrix itself.

Figure 4:
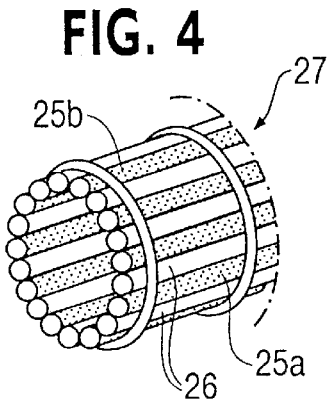
FIG. 4 is a schematic perspective view, on a large scale, of a portion of a second example of a structure which can form part of the constitution of a device in accordance with the invention.

FIG. 4 shows an embodiment variant of the structure of FIG. 3, in which variant this structure has been woven as a tube 27 so as to be, once flattened, in the form of a strip comprising two thicknesses of weaving. In this embodiment variant, it is possible to envisage a distribution of the yarns 26 of polymer matrix throughout the circumference of the tube or, on the contrary, to limit the presence of these yarns to a portion of this circumference such that, for example, the release of said active substance(s) takes place on only one of the faces of the strip resulting from the flattening of the tube. Thus, the release of the active substance(s) may be advantageously limited either to the face of the device intended to come into contact with the animal's skin in the case of medicinal active principles, or to the opposite face in the case of repellents, deodorants or fragrances.

Figure 5:
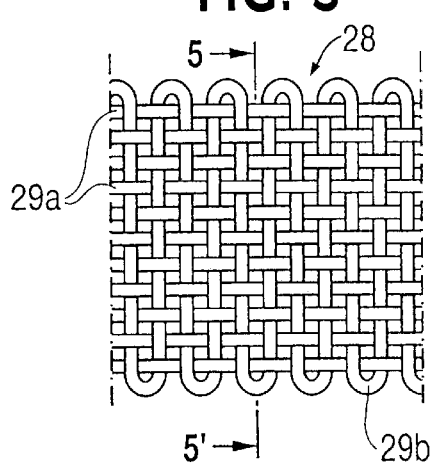
FIG. 5 is a schematic plan view, on a large scale, of a portion of a third example of a structure which can form part of the constitution of a device in accordance with the invention.
Figure 6:
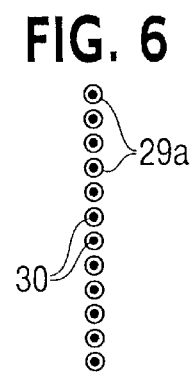
FIG. 6 is a schematic cutaway view, on a large scale, along the line 5–5' of FIG. 5.

The structure shown in FIGS. 5 and 6 is, like the structure illustrated in FIG. 3, a woven structure 28 in the form of a strip. However, the warp of which it is composed comprises an assembly of yarns 29a consisting of an organic or inorganic material like the yarns 25a of the structure illustrated in FIG. 3, but these yarns have been presheathed, for example by pultrusion, with a layer 30 of a polymer matrix containing the active substances. As a variant, it is of course possible to arrange for the yarns 29b forming the weft of the woven strip 28 also to be coated with a layer of said polymer matrix.

Figure 7:
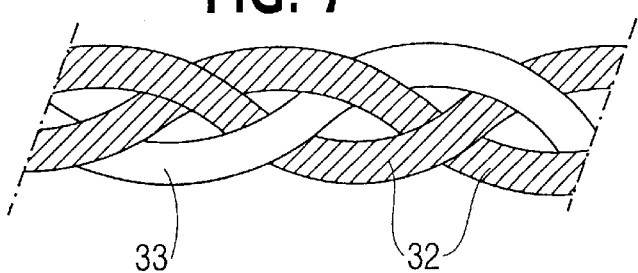
FIG. 7 is a schematic plan view, on a large scale, of a portion of a fourth example of a structure which can form part of the constitution of a device in accordance with the invention.

As can be seen in FIG. 7, another structure which can form part of the constitution of a device in accordance with the invention is represented by a braid 31 comprising, for example, two straps 32, preferably of rectangular right cross section and consisting of a material which is both strong and flexible such as leather straps, and which are interwoven with a strap 33, also preferably of rectangular right cross section and formed from a polymer matrix containing one or more active substances. The dimensions of the straps 32 and 33, which may be identical or different for the three straps, are chosen as a function of the dimensions which it is desired to give the braid itself and, in particular, the width and thickness it is desired to see it in.

Figure 8:
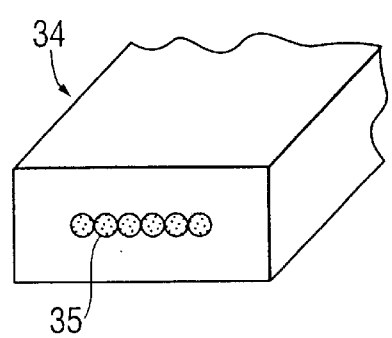
FIG. 8 is a schematic view in transverse cutaway, on large scale, of a portion of a fifth example of a structure which can form part of the constitution of a device in accordance with the invention.

The structure can also, as illustrated in FIG. 8, be in the form of a strip 34 formed from a polymer matrix containing one or more active substances, of parallelepipidal shape, and in which are immersed yarns 35 of an organic or inorganic material and which can optionally be present in the form of a fabric, a knitted material, a braid, a twist, a reinforcing weft, an entanglement of any kind or in the form of a bundle of yarns that are parallel or substantially parallel to each other and advantageously not joined together.

Figure 9:
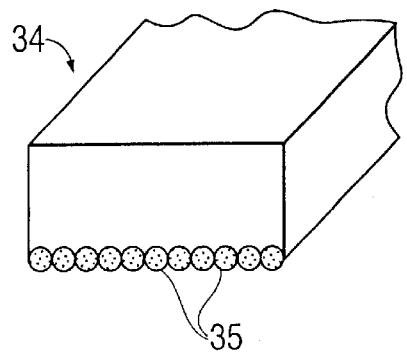
FIG. 9 is a schematic view in transverse cutaway, on large scale, of a portion of a sixth example of a structure which can form part of the constitution of a device in accordance with the invention.

As a variant, as shown in FIG. 9, these yarns of organic or inorganic material may be only partially incorporated in the strip 34 of polymer matrix and may form, for example, one of the faces of this strip.

The examples of structures which have just been described demonstrate all the possibilities that the invention offers, by varying the nature and dimensions of the materials constituting it, as well as their relative arrangement, their appearance and their color, for producing devices which, while ensuring the controlled release of one or more active substances, have excellent mechanical strength making them suitable for use as restraining means, without any risk of dissociation of said materials, as well as a decorative effect, when such an effect is desired. Specifically, these structures lend themselves to the production of many aesthetic patterns, allowing great variability in the presentation of the devices in accordance with the invention, or even a personalization of these devices, as well as the addition of security members such as identification plates, or purely decorative members.

EXAMPLE 1

Collars of the type represented in FIG. 1 are prepared:

by weaving polyamide yarns of the type PA 66 (Du Pont de Nemours) 1 mm in diameter together with 10 yarns of a matrix containing 25% polyvinyl chloride, 21% of a plasticizer (diisobutyl adipate), 4% of a stabilizer (epoxidized soybean oil), 40% of a filler (calcium carbonate) and, as active substance, 10% pyripropxyfen (antiparasitic agent with ovicidal and larvicidal action), also measuring 1 mm in diameter, so as to obtain a strap 20 mm long; and then attaching by sewing, to one end of segments each measuring 50 cm long and resulting from transverse coating of the strap thus obtained, a metal buckle provided with a tongue and, about 10 centimeters from this buckle, a metal tensioning ring for attaching a leash.

The strength of each of these collars was tested by subjecting the assembly formed by a collar and its leash, attached to each other via the ring which comprises said collar and the snap hook with which the leash is equipped, to tensile tests. These tests showed that these collars are capable of withstanding a tension of greater than 200 kg i.e. a much higher tension than that which a dog and/or its master are able to withstand.

The release kinetics of the pyriproxyfen were studied by placing collars on six Beagle dogs with an average weight of 10 kg. Samples of about 100 mg corresponding to a piece of yarn of said collars containing pyriproxyfen were taken at different times from each of the collars and analyzed by high performance liquid chromatography.

Table 1 below shows the change over time, expressed as a percentage, of the amount of pyriproxyfen remaining in the collars.

TABLE 1

| Time expressed in days | 0 | 28 | 56 | 91 | 182 | 238 | 364 |
| --- | --- | --- | --- | --- | --- | --- | --- |
| percentages of pyripropxyfen remaining | 100 | 85.8 | 74.9 | 65.6 | 43.1 | 32.7 | 20.5 |

Moreover, the ovicidal efficacy of the device was tested by placing devices on 6 cats for 6 months continuously. These devices were placed on the animals two days before carrying out an experimental infestation by depositing 20 fleas on each of the cats.

At the end of a period of 3 days following this infestation, the eggs of the fleas present on the cats were collected and placed in an incubator. No emergence of fleas was recorded, whereas the same experiment carried out with control cats not wearing a device leads to the hatching of from 50% to 60% of the eggs collected. An experimental infestation of the cats was repeated every month for 6 months. No emergence of fleas was recorded here either.

EXAMPLE 2

A collar of the type represented in FIG. 1 is prepared:

by pultrusing a polymer matrix containing 30% of polyvinyl chloride, 11% of a plasticizer (diisobutyl adipate), 4% of a stabilizer (epoxidized soybean oil), 40% of a filler (calcium carbonate) and, as active substance, 15% diazinon (antiparasitic agent which is active against fleas and ticks), together with a braid of polyamide yarns 8 mm wide and 1 mm thick, so as to obtain a strap having a structure in accordance with that represented in FIG. 7 and measuring 12 mm in width and 4 mm in thickness; and then by attaching, by riveting, to one end of segments each measuring 60 cm long and obtained by transverse cutting of the strap thus obtained, a polyamide lever clasp and, about 10 centimeters from this clasp, a system for attaching a leash.

The strength of the collars thus prepared was tested by walking ten dogs of different breeds, weighing between 15 kg and 30 kg and each wearing one of these collars, by means of a telescopic leash 5 meters long. At the end of the walks, no breakages or deterioration were noted.

The release kinetics of the diazinon were studied by placing collars on 6 Beagle dogs weighing between 6 kg and 11 kg. Samples of about 500 mg of the matrix containing diazinon were taken at different times and analyzed by high performance liquid chromatography.

Table 2 below shows the change over time, expressed in the form of percentages, of the amount of diazinon remaining in the collars.

TABLE 2

| Time expressed in days | 0 | 28 | 56 | 126 | 196 | 252 | 308 |
|---|---|---|---|---|---|---|---|
| Percentages of Diazinon remaining | 100 | 81.2 | 73.7 | 56.4 | 39.5 | 28.3 | 15.6 |

The antiparasitic efficacy of the collars was tested by placing collars on 6 dogs for 9 months continuously. The collars were placed on the dogs two days before subjecting them to an experimental infestation by placing 20 fleas and 10 ticks on each dog. At the end of a period of 3 days following this infestation, no fleas or ticks were found on the dogs, whereas by carrying out the same infestation on dogs not wearing a collar, about ten fleas and 4 to 5 ticks are found on each of them on average.

An experimental infestation of the dogs was repeated every month for 9 months. In all cases, no fleas or ticks were found on the dogs.

EXAMPLE 3

Halters for horses are prepared using a strap obtained, as described in Example 1, by weaving polyamide yarns and yarns of a polymer matrix containing 10% lambda-cyhalothrin (antiparasitic agent active against flies) as active substance.

The efficacy of these halters against flies was tested by placing halters on 6 riding horses in an equestrian center, for the three months of summer and continuously. The presence of very few flies around the head of these horses, compared with the other horses in the center, was noted.

Moreover, the halters were found to have excellent restraining strength when the horses which were fitted with them were walked on a lead rope.

As emerges from the text hereinabove, the invention is not limited in any way to its methods of implementation, preparation or application which have just been described in greater detail; on the contrary, it encompasses all the variants which may occur to a person skilled in the art, without departing from the context or scope of the present invention.

What is claimed is:

1. A device intended to be worn by an animal, wherein said device is capable of controlled release of one or more active substances and of serving simultaneously as a restraining means to control and master said animal, said device comprising a first material comprising a polymer matrix including said one or more active substances, and a second material for giving said device mechanical strength, wherein the two materials are combined in a single crosslinked structure.

2. The device according to claim 1, wherein the crosslinked structure is a structure obtained by weaving or knitting at least one yarn of polymer matrix with yarns of an organic or inorganic material.

3. The device according to claim 1, wherein the crosslinked structure is a substance obtained by weaving or knitting yarns of an organic or inorganic material coated with one or more layers of polymer matrix with yarns selected from the group consisting of yarns that are not coated with the polymer matrix and yarns that are coated with the polymer matrix.

4. The device according to claim 1, wherein the crosslinked structure is obtained by means of circular weaving or knitting.

5. The device according to claim 1, wherein the crosslinked structure is a structure obtained by braiding or twisting at least one yarn of polymer matrix with yarns of an organic or inorganic material.

6. The device according to claim 1, wherein the crosslinked structure is a structure obtained by braiding or twisting yarns of an organic or inorganic material coated with one or more layers of polymer matrix, with yarns selected from the group consisting of yarns that are not coated with the polymer matrix and yarns that are coated with the polymer matrix.

7. The device according to any one of claims 1 to 6, wherein said device comprises closure means to keep said device on the animal and means for removably attaching a leash or lead.

8. The device according to any one of claims 1 to 6, wherein said device is a collar, a harness or a halter.

9. The device according to claim 8, wherein said collar, harness or halter is intended to protect or treat the animal against endoparasites or ectoparasites.

10. The device according to claim 1, wherein said one or more active substances are selected from the group consisting of: medicinal active principles of systemic or local use, products with repellent power, products with deodorant power and fragrances.

11. The device according to claim 10, wherein said one or more active substances are selected from the group consisting of: insecticides, acaricides, ovicides, larvicides, antibiotics of macrolide type, vitamins, steroidal anti-inflammatory agents, nonsteroidal anti-inflammatory agents and fungicides.

12. A method for manufacturing a device according to any one of claims 1–6, wherein said method comprises a step of combining the polymer matrix containing said one or more active substances and the material for giving said device mechanical strength, such that they form a single crosslinked structure.

13. A method according to claim 12, wherein said method further comprises an operation step of weaving, knitting, braiding or twisting.

* * * * *